(12) United States Patent
Davydok et al.

(10) Patent No.: US 8,671,390 B2
(45) Date of Patent: Mar. 11, 2014

(54) RESOLVING CONFLICTS WHEN IMPORTING AN APPLICATION CUSTOMIZATION

(75) Inventors: Dmitri Davydok, Redmond, WA (US); Balaji Balasubramanyan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1582 days.

(21) Appl. No.: 11/933,562

(22) Filed: Nov. 1, 2007

(65) Prior Publication Data
US 2009/0119345 A1    May 7, 2009

(51) Int. Cl.
*G06F 9/44*    (2006.01)

(52) U.S. Cl.
USPC ............ 717/116; 717/108; 717/109; 717/169

(58) Field of Classification Search
None
See application file for complete search history.

(56) References Cited

U.S. PATENT DOCUMENTS

| | | | | |
|---|---|---|---|---|
| 6,442,748 B1* | 8/2002 | Bowman-Amuah | .......... | 717/108 |
| 6,550,057 B1* | 4/2003 | Bowman-Amuah | .......... | 717/109 |
| 6,601,234 B1* | 7/2003 | Bowman-Amuah | .......... | 717/116 |
| 7,051,319 B1* | 5/2006 | Thorson et al. | .................. | 717/116 |
| 7,076,778 B2* | 7/2006 | Brodersen et al. | ............ | 717/169 |
| 7,165,239 B2* | 1/2007 | Hejlsberg et al. | ............. | 717/116 |
| 7,203,700 B1* | 4/2007 | Kumar et al. | .................. | 717/116 |
| 7,293,254 B2* | 11/2007 | Bloesch et al. | ................ | 717/116 |
| 7,349,913 B2* | 3/2008 | Clark et al. | .................... | 717/116 |
| 7,464,117 B2* | 12/2008 | Kaplan et al. | .......................... | 1/1 |
| 7,669,183 B2* | 2/2010 | Bowman et al. | .............. | 717/109 |
| 7,676,498 B2* | 3/2010 | England et al. | ........ | 707/999.107 |
| 7,676,506 B2* | 3/2010 | Reinsch | ........................ | 717/169 |
| 7,827,526 B2* | 11/2010 | Huin et al. | ..................... | 717/109 |
| 7,979,842 B2* | 7/2011 | Bloesch et al. | ................ | 717/108 |
| 8,091,067 B2* | 1/2012 | Roche et al. | .................. | 717/109 |
| 8,091,081 B2* | 1/2012 | Thorson et al. | ............... | 717/116 |
| 8,191,040 B2* | 5/2012 | Hejlsberg et al. | ............. | 717/116 |

(Continued)

OTHER PUBLICATIONS

Michael Fruergaard Pontoppidan; The solution to the elemetn ID problem; MSDN Blogs; Jul. 11, 2011; retrieved online on Sep. 30, 2013; p. 1; Retrieved from the Internet: <URL: http://blogs.msdn.com/b/mfp/archive/2011/07/11/the-solution-to-the-element-id-problem.aspx>.*

(Continued)

*Primary Examiner* — Thuy Dao
*Assistant Examiner* — Hanh T Bui
(74) *Attorney, Agent, or Firm* — Damon Rieth; David Andrews; Micky Minhas (57) ABSTRACT

A conflict resolution system allows an end user to export customizations to an application program so that the customizations can be imported by another end user. The conflict resolution system may export a customization by outputting metadata describing the customization. When the customization is a custom property, the metadata may include the name of the entity with which the property is associated, the name of the property, the type of the property, a globally unique identifier for the property, the location on the user interface for the input field for the custom property, and so on. End users may want to share not only their customizations but also the underlying data associated with a customization. When a conflict occurs during import of a customization alone without the data, then the conflict resolution system resolves the conflict in favor of the imported property. When a conflict occurs during import of a customization with data, the conflict resolution system resolves the conflict in favor of the existing property.

20 Claims, 6 Drawing Sheets

(56) References Cited

U.S. PATENT DOCUMENTS

| | | | |
|---|---|---|---|
| 8,321,834 B2* | 11/2012 | Baker et al. | 717/108 |
| 8,464,214 B2* | 6/2013 | Miloushev et al. | 717/108 |
| 2002/0107761 A1 | 8/2002 | Kark et al. | |
| 2003/0037033 A1* | 2/2003 | Nyman et al. | 707/1 |
| 2003/0107591 A1 | 6/2003 | Jameson | |
| 2004/0002919 A1 | 1/2004 | Tosswill | |
| 2005/0010900 A1* | 1/2005 | Huin et al. | 717/116 |
| 2005/0050474 A1 | 3/2005 | Bells et al. | |
| 2006/0195794 A1 | 8/2006 | Sun et al. | |
| 2006/0294120 A1* | 12/2006 | Li et al. | 707/100 |
| 2007/0033568 A1 | 2/2007 | Barrieau et al. | |
| 2007/0169084 A1 | 7/2007 | Frank et al. | |
| 2007/0185919 A1* | 8/2007 | Kaplan et al. | 707/201 |
| 2007/0282800 A1* | 12/2007 | England et al. | 707/3 |
| 2009/0300071 A1* | 12/2009 | Arcese et al. | 717/169 |

OTHER PUBLICATIONS

Goksel Asian and Dennis McLeod; Semantic heterogeneity resolution in federated databases by metadata implantation and stepwise evolution; The VLDB Journal; 1999; retrieved online on Sep. 30, 2013; pp. 120-132; Retrieved from the Internet: <URL: http://delivery.acm.org/10.1145/770000/765512/90080120.pdf?ip=151.207.250.71&id=765512&acc=ACTIVE%SERVIC>.*

Ning Sun et al.; An Efficient Metadata Identifier Management Schemem in Multi-CMSs Environment; IEEE; 2007; retrieved online on Sep. 30, 2013; pp. 590-594; Retrieved from the Internet: <URL: http://ieeexplore.ieee.org/stamp/stamp.jsp?tp=&arnumber=4420323>.*

Mackay, Wendy, E., "Patterns of Sharing Customizable Software," CSCW 90 Proceedings, Oct. 1990 (13 pages).

Dai, Kai-yu et al., "Three-Dimensional Online Customization Ordering System," The 8th International Conference on Computer Supported Cooperative Work in Design Proceedings, Copyright 2003 IEEE (6 pages).

"View XML Content from Office Customization Tool Customization Files," Office Systems, 2007 Office Resource Kit, Sep. 27, 2007 (6 pages) http://technet2.microsoft.com/Office/en-us/library/4e9de577-5953-4aaf-8af0-a73910716a [Accessed Oct. 16, 2007].

* cited by examiner

RESOLVING CONFLICTS WHEN IMPORTING AN APPLICATION CUSTOMIZATION

BACKGROUND

Many application programs provide a mechanism for end users to customize various aspects of the application. These customizations can modify the look and feel of the user interface, add or remove properties from various entities (e.g., invoice or contact), modify the values of a multiple choice field (i.e., a pick list), and so on. For example, if the application program is a customer relationship management ("CRM") program that allows a user to track contact information, the user may customize the user interface by changing the color of a telephone number field or rearranging the address and telephone number fields of a form so that the telephone number is prominently displayed. As another example, a user who is a shoe salesperson may customize the contact information of the CRM program by adding a custom shoe size property for tracking the shoe sizes of the salesperson's customers. If the CRM program provides a default pick list of customer statuses (e.g., active and inactive), the salesperson may want to add a new status (e.g., prospect) to the pick list.

Such application programs typically store information describing the customizations in a customization store. When a new property is added to an entity, the application program may add an entry to the customization store that maps the entity to the new property and includes metadata that describes the property. The metadata may include the type of the property (e.g., integer or a date), the name of the property (e.g., "phone"), the location within the user interface for a field for the property, and so on. (The metadata for a pick list is similar to that for a property except that the location for a pick list value may be its index within the pick list.) Such application programs may store the data of custom properties within a customization table of the data store for the application program. The customization table for an entity may include a row for each instance of the entity and a column for each added property of that entity. For example, if the entity is a contact for a shoe salesperson, then a contact customization table may include a row for each contact (e.g., John Smith or Tom Brown) and a column for holding the value of the shoe size of the contact.

Because each end user can customize the application program as they like, the data collected by the end users of the same enterprise may vary significantly and be inconsistent. For example, if the enterprise is a department store, then a shoe salesperson may track the shoe size of customers, while a clothing salesperson may track the neck size of customers. Even the same data collected by two different end users may be named differently. For example, one shoe salesperson may have a custom property named "ShoeSize," and another shoe salesperson may have a custom property named "FootLength." Because of the inconsistencies in the naming of custom properties, it can be difficult for the salespeople of the department store to share their customizations.

SUMMARY

A conflict resolution system for resolving conflicts in customizations of application programs is provided. The conflict resolution system allows an end user to export customizations to an application program so that the customizations can be imported by another end user. The conflict resolution system may export a customization by outputting metadata describing the customization. A customization may be referred to as a "custom metadata element" that encompasses a custom property, a custom pick list value, and other custom elements of an application program. When the customization is a custom property, the metadata may include the name of the entity which the property is associated, the name of the property, the type of the property, a globally unique identifier for the property, the location on the user interface for the input field for the custom property, and so on. When an end user imports a customization, the customization will be consistent with the exported customization. In certain situations, end users may want to share not only their customizations but also the underlying data associated with a customization. When the data is for a customization, the conflict resolution system exports the customization along with the associated data. An end user can then import the customization along with the data. When a conflict occurs during import of a customization alone without the data, then the conflict resolution system resolves the conflict in favor of the imported property. When a conflict occurs during import of a customization with data, the conflict resolution system resolves the conflict in favor of the existing property.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A conflict resolution system for resolving conflicts in customizations of application programs is provided. In some embodiments, the conflict resolution system allows an end user to export customizations to an application program so that the customizations can be imported by another end user. The conflict resolution system may export a customization by outputting metadata describing the customization. When the customization is a custom property, the metadata may include the name of the entity (e.g., contact) with which the property is associated, the name of the property (e.g., "ShoeSize"), the type of the property (e.g., integer), a globally unique identifier for the property, the location on the user interface for the input field for the custom property, and so on. For example, a shoe salesperson who has added a shoe size custom property for a contact entity can export metadata describing the shoe size so that the shoe size property can be imported by other shoe salespeople. When an end user imports a customization, the customization will be consistent with the exported customization. For example, each shoe salesperson who imports a shoe size customization will have a shoe size property with the same name and type that is displayed on the same location on the user interface. In certain situations, end users may want to share not only their customizations but also the underlying data associated with a customization. For example, a shoe salesperson who is leaving on an extended vacation may want to export the data for his customers to another salesperson who will be servicing those customers during the vacation. When the data is for a customization, the conflict resolution system exports the customization along with the associated data. An end user can then import the customization along with the data.

During the process of importing a customization with or without data, conflicts can occur with existing properties of the entities of the application program. One conflict may occur when the name of an imported property for an entity is the same as the name of an existing custom property for that entity. An example would be if a salesperson is importing a customization that adds a "ShoeSize" property to the contact entity and that salesperson has already customized his system to include a "ShoeSize" custom property for the contact entity. Another conflict may occur when a globally unique identifier of an imported property that is the same as that of an existing property. This may occur, for example, when the salesperson returns from vacation and imports the customizations and data from the salesperson who was helping out during vacation. In such a case, the "ShoeSize" property originally created by the vacationing salesperson will have the same globally unique identifier, but may have a different name because the salesperson helping out may have renamed the "ShoeSize" property to "FootLength."

In some embodiments, the conflict resolution system resolves conflicts based on whether a customization alone (i.e., without data) is being imported or a customization with data is being imported. When a customization alone is being imported, the conflict resolution system assumes that the importing end user primarily wants the customization and thus resolves any conflict in favor of an imported property. In contrast, when a customization with data is being imported, the conflict resolution system assumes that the importing end user primarily wants the data and thus resolves any conflict in favor of an existing property of the end user. If no conflict exists (e.g., both the name and the globally unique identifier of the imported property are not the same as any existing property), then a new property can be created with the name and the unique identifier of the imported property.

When a conflict occurs during import of a customization alone, then the conflict resolution system resolves the conflict in favor of the imported property. The conflict resolution system resolves a conflict in names by changing the name of the conflicting existing property and creating a new custom property that has the name and the globally unique identifier of the imported property. The conflict resolution system resolves a conflict in unique identifiers by changing the name of the existing property to the name of the imported property without creating a new custom property.

Figure 1:
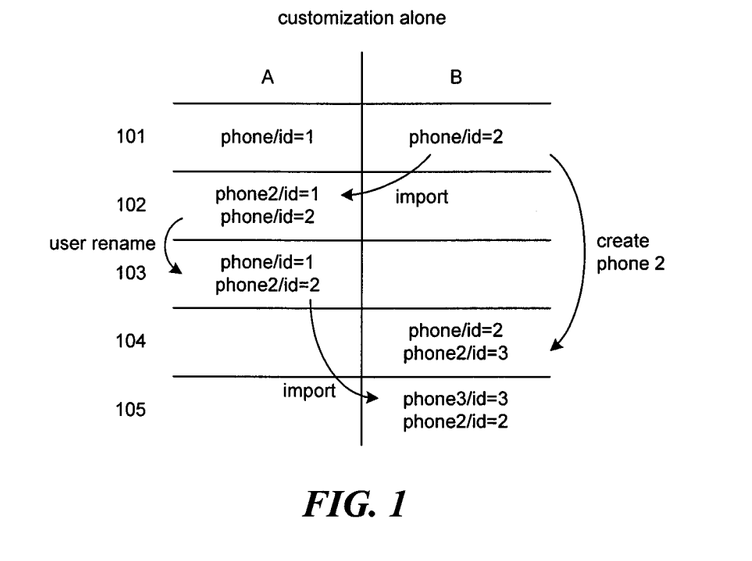
FIG. 1 illustrates an example resolution of conflicts when a customization is imported without data.

FIG. 1 illustrates an example resolution of conflicts when a customization is imported without data. In this example, user A and user B have each defined a custom property for their application program. As illustrated by row 101, user A has defined a custom property with the name of "phone" that was given a unique identifier of "1," and user B has defined a custom property with the name of "phone" that was given a unique identifier of "2." The customization component of the application program assigns a globally unique identifier to each custom property so that a custom property defined by one user can be tracked regardless of changes to its name by that user or other users. User B then exports the customization so that the customization alone can be imported by user A. Because user A already has an existing property with the name of "phone," a conflict exists that needs to be resolved. As illustrated by row 102, the conflict resolution system renames the existing property with the unique identifier of "1," originally named "phone," as "phone2" and then creates a new custom property with the name of "phone" and the unique identifier of "2" of the imported property. As illustrated by row 103, user A may eventually switch the names of the properties so that the imported property with the unique identifier of "2" has the name of "phone2" and the original custom property with the unique identifier of "1" has the name of "phone." As illustrated by row 104, user B may eventually create a new custom property with the name of "phone2" with a unique identifier of "3." As illustrated by row 105, user A may export the customization for its custom property with the name of "phone2" and unique identifier of "2." User B then imports the customization alone. Because user B already has an existing property with the name "phone2," a conflict exists. To resolve the conflict, the conflict resolution system renames the existing property from "phone2" to "phone3" similar to the renaming when the property was originally imported by user A as illustrated by row 102. There is also a conflict because user B already has an existing property with the unique identifier of "2." To resolve this additional conflict, the conflict resolution system renames the existing property, giving it the name of the imported property; that is, it renames the existing property, named "phone," as "phone2."

When a conflict occurs with a customization with data, the conflict resolution system resolves the conflict in favor of the existing property. The conflict resolution system resolves a conflict in names by creating a new custom property having a name that is different from the name of the imported property and a unique identifier that is the same as the unique identifier of the imported property. The conflict resolution system resolves a conflict in unique identifiers by retaining the name of the existing property. The data is imported into the custom property with the same unique identifier as the imported property.

Figure 2:
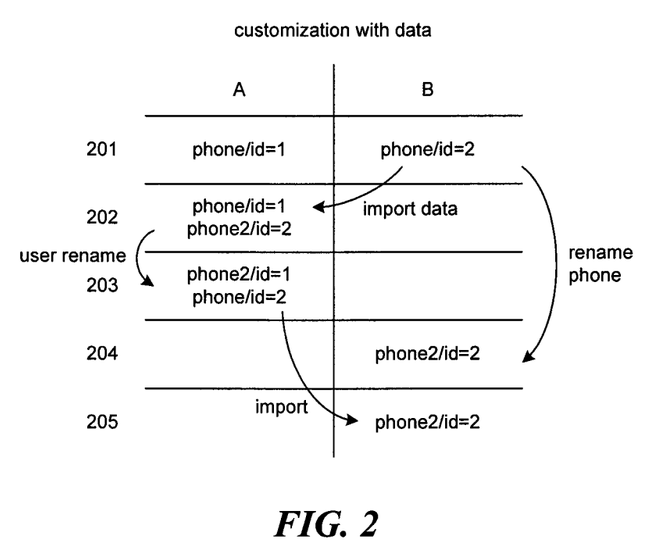
FIG. 2 illustrates an example resolution of conflicts when a customization is imported with data.

FIG. 2 illustrates an example resolution of conflicts when a customization is imported with data. In this example, user A and user B have each defined a custom property for their application program. As illustrated by row 201, user A has defined a custom property with the name of "phone" that was given a unique identifier of "1," and user B has defined a custom property with the name of "phone" that was given a unique identifier of "2." User B then exports the customization with data so that the customization with data can be imported by user A. Because user A already has an existing property with the name of "phone," the conflict resolution system needs to resolve the conflict. As illustrated by row 202, the conflict resolution system creates a new property with a new name of "phone2," rather than the name of the imported property, and with the unique identifier "2" of the imported property. The imported data is then imported into the new property with the unique identifier of "2." As illustrated by row 203, user A may eventually switch the names of the properties. As illustrated by row 204, user B may eventually rename the existing property with the unique identifier of "2," originally named "phone," as "phone2." As illustrated by row 205, user A may export the customization with data for its property with the name of "phone" and unique identifier of "2." User B then imports the customization with data. Because user B already has an existing property with the unique identifier of "2," there is a conflict. To resolve the conflict, the conflict resolution system retains the name "phone2" of the existing property with the unique identifier of "2." The imported data is then imported into existing property with the unique identifier of "2."

Figure 3:
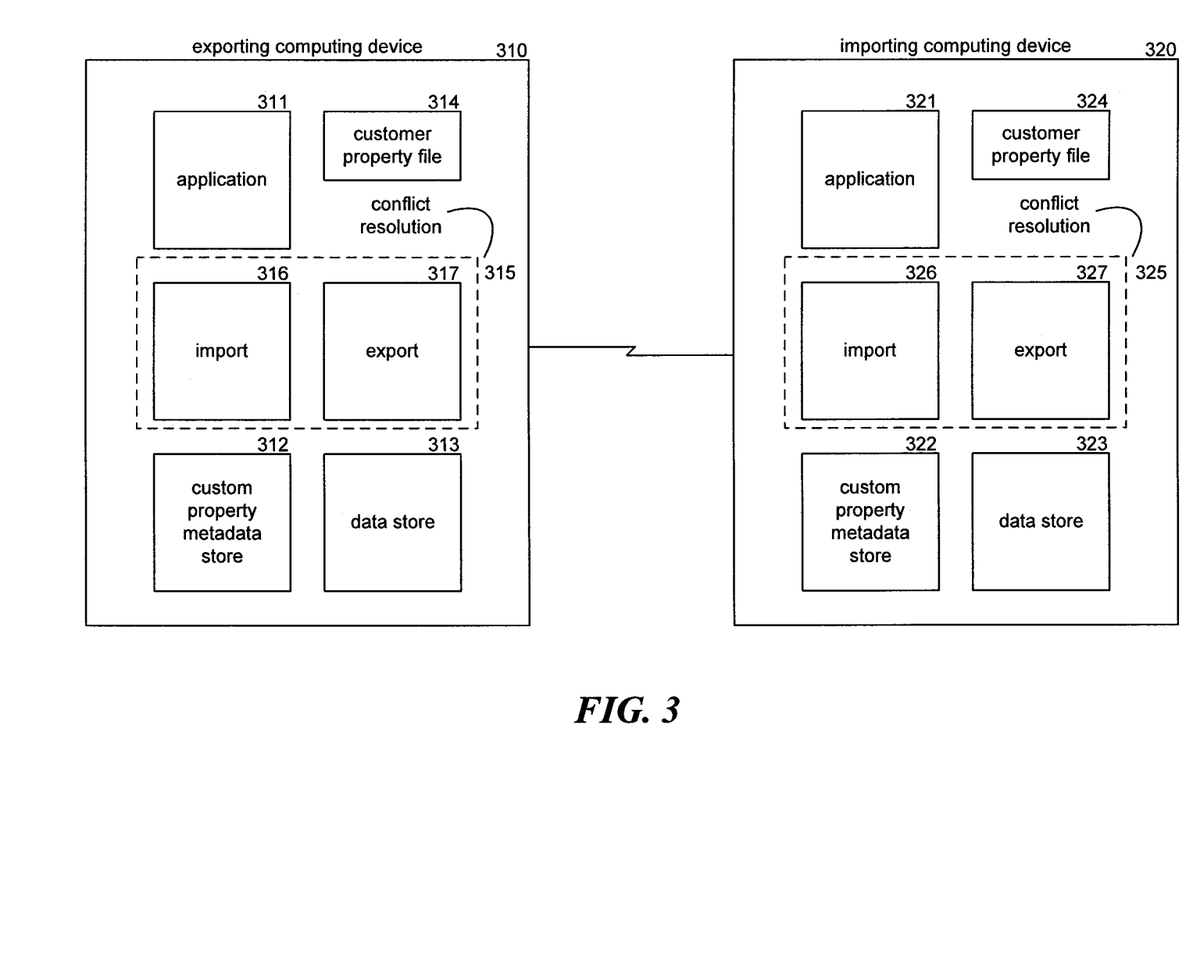
FIG. 3 is a block diagram that illustrates components of the conflict resolution system in some embodiments.

FIG. 3 is a block diagram that illustrates components of the conflict resolution system in some embodiments. The conflict resolution system may execute as part of an exporting computing device 310 and an importing computing device 320. The exporting computing device may include an application program 311, a custom property metadata store 312, a data store 313, a custom property file 314, and a conflict resolution component 315. The conflict resolution component may include an import component 316 and an export component 317. The application program may provide for the defining of the custom properties and storing of the metadata for the custom properties in the custom property metadata store. The application program may store data for both custom properties and non-custom properties in the data store. The export component exports custom properties by writing the metadata for the custom properties to the custom property file and optionally exports the data associated with the custom properties by writing the data to the custom property file. The import component imports the custom properties of a custom property file and optionally its data. The import component resolves any conflicts between the names and unique identifiers of custom properties. The importing computing device may include an application program 321, a custom property metadata store 322, a data store 323, a custom property file 324, and a conflict resolution component 325. The conflict resolution component may include an import component 326 and an export component 327. The components of the import computing device function in the same way as the components of the export computing device.

The computing device on which the conflict resolution system is implemented may include a central processing unit, memory, input devices (e.g., keyboard and pointing devices), output devices (e.g., display devices), and storage devices (e.g., disk drives). The memory and storage devices are tangible computer-readable storage media that may be encoded with computer-executable instructions that implement the system, which means a computer-readable medium that contains the instructions. In addition, the instructions, data structures, and message structures may be transmitted via a data transmission medium, such as a signal on a communication link. Various communication links may be used, such as the Internet, a local area network, a wide area network, a point-to-point dial-up connection, a cell phone network, and so on.

Embodiments of the conflict resolution system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The conflict resolution system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Table 1 illustrates an example custom property file that is exported by an exporting computing device and imported by an importing computing device. The custom property file is an extensible Markup Language ("XML") file with a schema that specifies user fields and pick list elements for defining the custom properties and data elements for providing the data of the custom properties. The example custom property file of Table 1 defines a custom property but does not include the data of the property. Lines 1 and 35 delimit the schema of the custom properties. Lines 2 and 19 delimit the custom properties specified by a "UserFields" element. Lines 3 and 14 delimit the custom properties for a contact entity. Lines 4 and 13 delimit the metadata for a custom property. Line 4 specifies that the custom property has type of "number." Line 5 specifies that the name of the custom property is "ShoeSize." Line 6 specifies the unique identifier of the custom property. Line 7 specifies the display format for the custom property. Lines 8 and 12 delimit the location of the custom property on the user interface. Line 9 specifies the area of the user interface. Line 10 specifies the column of the area. Line 11 specifies the group within the column. Lines 15-18 specify that there are no exported custom properties for the account, opportunity, and project entities. Lines 21 and 34 define the exported custom pick lists. In this example, only one pick list is exported, and it has the values of "Current" and "Overdue."

TABLE 1

| | |
|---|---|
| 1. | <CustomizationSchema> |
| 2. |   <UserFields> |
| 3. |     <Contact> |
| 4. |       <UserField FieldType="Number"> |
| 5. |         <FieldName>ShoeSize</FieldName> |
| 6. |         <FieldGUID>281cda63-5bef-4737-879e-bc0deacfa916</FieldGUID> |
| 7. |         <FieldDisplayFormatIndex>2</FieldDisplayFormatIndex> |
| 8. |         <Location> |
| 9. |           <Area>UserFieldsTab</Area> |
| 10. |           <Column>Left</Column> |
| 11. |           <Group>Lead Details</Group> |
| 12. |         </Location> |
| 13. |       </UserField> |
| 14. |     </Contact> |
| 15. |     <Account /> |
| 16. |     <Opportunity> |
| 17. |     </Opportunity> |
| 18. |     <Project /> |
| 19. |   </UserFields> |
| 20. |   <Picklists> |
| 21. |     <Picklist> |
| 22. |       <Id>3954ce50-6633-40d9-8eaa-77951f500e9a</Id> |
| 23. |       <Values> |
| 24. |         <GuidAndValue> |
| 25. |           <Guid>bbc77c38-1f96-4ff4-a266-8a22e79d54d1</Guid> |
| 26. |           <Value>Current</Value> |
| 27. |         </GuidAndValue> |
| 28. |         <GuidAndValue> |
| 29. |           <Guid>7e403eb5-4362-49cb-815c-7c6a7a2cb1c8</Guid> |
| 30. |           <Value>Overdue</Value> |
| 31. |         </GuidAndValue> |
| 32. |       </Values> |
| 33. |     </Picklist> |
| 34. |   </Picklists> |
| 35. | </CustomizationSchema> |

Figure 4:
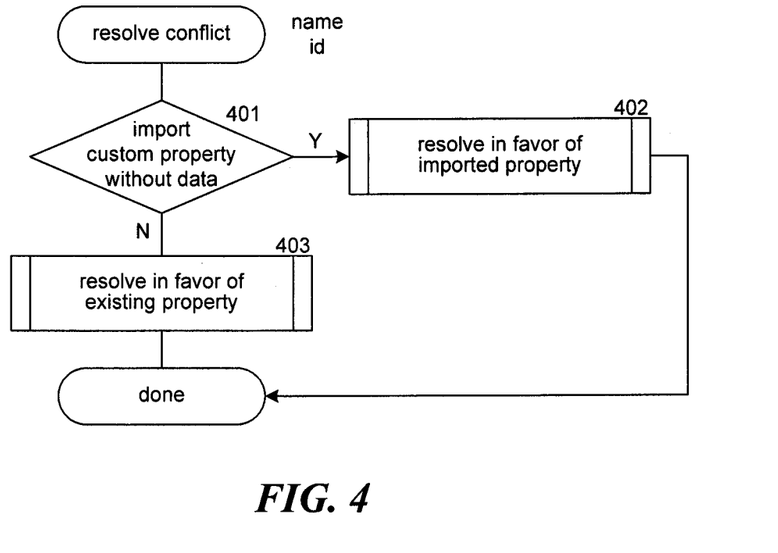
FIG. 4 is a flow diagram that illustrates the processing of the resolve conflict component of an input component of the conflict resolution system in some embodiments.

FIG. 4 is a flow diagram that illustrates the processing of the resolve conflict component of an input component of the conflict resolution system in some embodiments. The component is passed the name and the unique identifier of an imported property. The component resolves any conflict depending on whether the custom property is imported with or without data. In decision block 401, if the property is imported without data, then the component continues at block 402, else the component continues at block 403. In block 402, the component invokes the resolve in favor of imported property component and then completes. In block 403, the component invokes the resolve in favor of existing property component and then completes.

Figure 5:
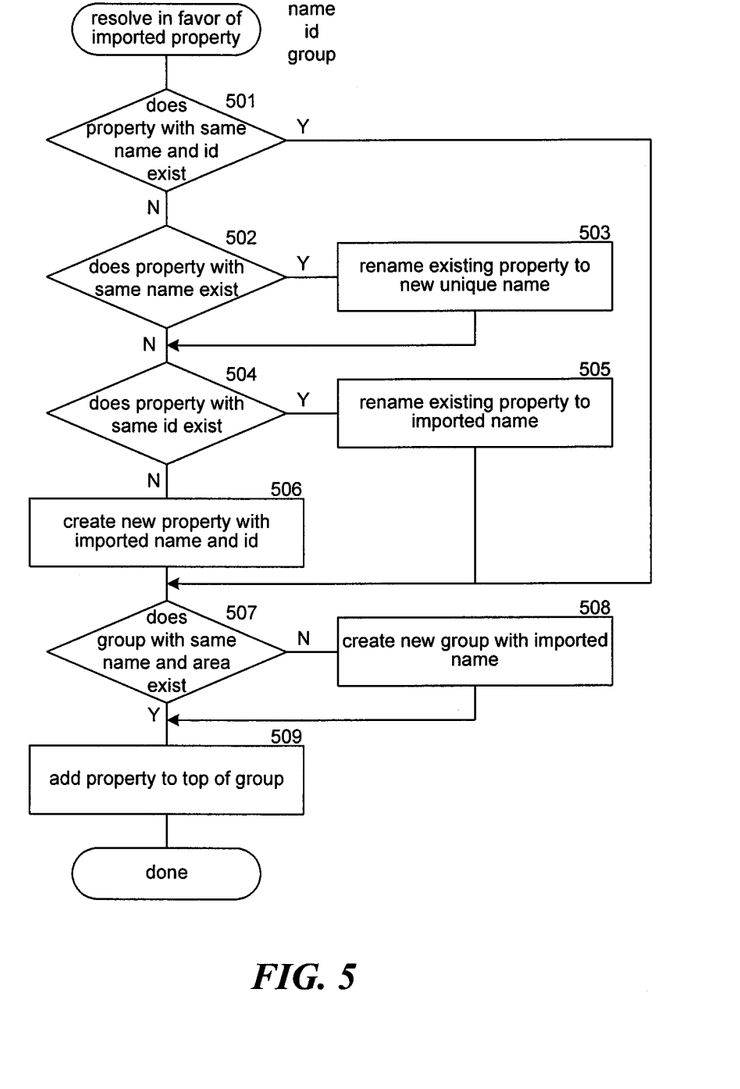
FIG. 5 is a flow diagram that illustrates the processing of the resolve in favor of imported property component of the conflict resolution system in some embodiments.

FIG. 5 is a flow diagram that illustrates the processing of the resolve in favor of imported property component of the conflict resolution system in some embodiments. The component is passed the name and unique identifier of a property to be imported along with its group. The group of a custom property specifies a group within the user interface where the field for the imported property is to be displayed. In decision block 501, if a custom property with the same name and unique identifier of the imported property already exists, then no name or unique identifier conflict exists and the component continues at block 507, else the component continues at block 502. In blocks 502-505, the component identifies and resolves any conflict. In decision block 502, if a custom property already exists with a name that is the same as the name of the imported property but with a unique identifier that is different from the unique identifier of the imported property, then a conflict in names exists and the component continues at block 503, else the component continues at block 504. In block 503, the component renames that existing property with a new unique name and then continues at block 504. In decision block 504, if a custom property already exists with a unique identifier that is the same as the unique identifier of the imported property but with a name that is different from the name of the imported property, then a conflict in unique identifiers exists and the component continues at block 505, else the component continues at block 506. In block 505, the component renames that existing property with the name of the imported property and then continues at block 507. In block 506, since there is no conflict in the unique identifiers, the component creates a new custom property with the name and unique identifier of the imported property. In blocks 507-509, the component adds the imported property to the appropriate group. In decision block 507, if a group with the same name and area already exists, then the component continues at block 509, else the component creates a new group with the imported group name in block 508. In block 509, the component adds the imported property to the top of the group and then completes.

Figure 6:
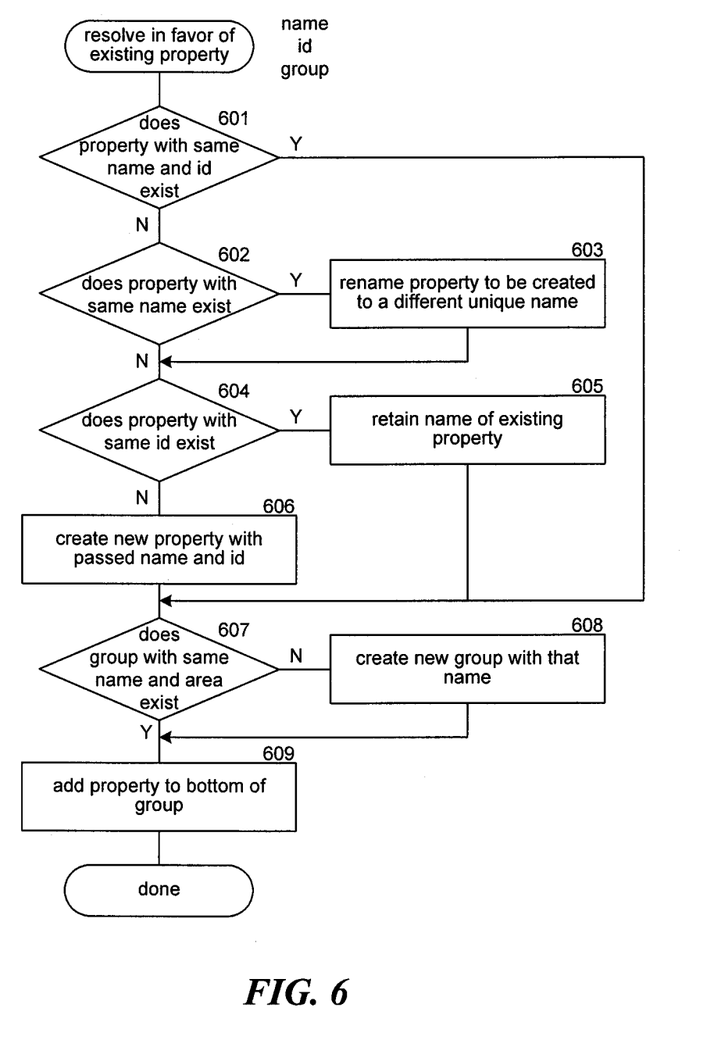
FIG. 6 is a flow diagram that illustrates the processing of the resolve in favor of existing property component of the conflict resolution system in some embodiments.

FIG. 6 is a flow diagram that illustrates the processing of the resolve in favor of existing property component of the conflict resolution system in some embodiments. The component is passed the name and unique identifier of a property to be imported along with its group. In decision block 601, if a custom property with the same name and unique identifier as the imported property already exists, then no conflict exists and the component continues at block 607, else the component continues at block 602. In blocks 602-605, the component identifies and resolves any conflict. In decision block 602, if a custom property already exists with a name that is the same as the name of the imported property but with a unique identifier that is different from the unique identifier of the imported property, then the component continues at block 603, else the component continues at block 604. In block 603, the component renames the imported property with a new unique name and then continues at block 604. In decision block 604, if a custom property already exists with a unique identifier that is the same as the unique identifier of the imported property but with a name that is different from the name of the imported property, then the component continues at block 605, else the component continues at block 606. In block 605, the component retains the name of the existing property and then continues at block 607. In block 606, since there is no conflict with the unique identifier, the component creates a new custom property with the name (possibly renamed in block 603) and unique identifier of the imported property. In blocks 607-609, the component adds the imported property to the appropriate group. In decision block 607, if a group with the same name and area already exists, then the component continues at block 609, else the component creates a new group in block 608. In block 609, the component adds the imported property to the bottom of the group and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, if the location of an imported property conflicts with an existing location, the conflict resolution system can resolve the conflict in the same way as it resolves a conflict in names. Also, the conflict resolution system can be used to resolve conflicts for a variety of elements of an application program such as pick list values. Accordingly, the invention is not limited except as by the appended claims.

We claim:

1. A method in a computing device for importing a customization of custom metadata elements of an application program, the method comprising:
   receiving an indication of a name and a unique identifier of the imported custom metadata element of the application program;
   determining whether an existing custom metadata element of the application program has a name that is the same as the name of the imported custom metadata element and a unique identifier that is different from the unique identifier of the imported custom metadata element;
   when it is determined that an existing custom metadata element of the application program has a name that is the same as the name of the imported custom metadata element and a unique identifier that is different from the unique identifier of the imported custom metadata element,
      changing the name of the existing custom metadata element; and
      creating a new custom metadata element having the name and the unique identifier of the imported custom metadata element;
   determining whether an existing custom metadata element of the application program has a name that is different from the name of the imported custom metadata element and a unique identifier that is the same as the unique identifier of the imported custom metadata element; and
   when it is determined that an existing custom metadata element of the application program has a name that is different from the name of the imported custom metadata element and a unique identifier that is the same as the unique identifier of the imported custom metadata element, changing the name of the existing custom metadata element to the name of the imported custom metadata element.

2. The method of claim 1 wherein the imported custom metadata element specifies a group with a group name and an area and when no existing group of the application has a group name and an area that is the same as the group name and the area of an imported custom metadata element, creating a new group with the group name and the area of the group of the imported custom metadata element.

3. The method of claim 2 including adding the imported custom metadata element to the top of the group.

4. The method of claim 1 wherein the receiving includes receiving metadata for the imported custom metadata element that includes name, unique identifier, type, format, and location.

5. The method of claim 4 wherein the metadata specifies the entity with which the imported custom metadata element is associated.

6. The method of claim 5 wherein the metadata is stored in accordance with an XML schema.

7. The method of claim 1 wherein when an existing custom metadata element of the application program has a name that is the same as the name of the imported custom metadata element and a unique identifier that is the same as the unique identifier of the imported custom metadata element, retaining the name and the unique identifier of the existing custom metadata element.

8. A method in a computing device for importing data for a customization of custom metadata elements of an application program, the method comprising:
receiving an indication of a name and a unique identifier of the imported custom metadata element of the application program;
determining whether an existing custom metadata element of the application program has a name that is the same as the name of the imported custom metadata element and a unique identifier that is different from the unique identifier of the imported custom metadata element;
when it is determined that an existing custom metadata element of the application program has a name that is the same as the name of the imported custom metadata element and a unique identifier that is different from the unique identifier of the imported custom metadata element, creating a new custom metadata element having a name that is different from the name of the imported custom metadata element and a unique identifier that is the same as the unique identifier of the imported custom metadata element;
determining whether an existing custom metadata element of the application program has a name that is different from the name of the imported custom metadata element and a unique identifier that is the same as the unique identifier of the imported custom metadata element;
when it is determined that an existing custom metadata element of the application program has a name that is different from the name of the imported custom metadata element and a unique identifier that is the same as the unique identifier of the imported custom metadata element, retaining the name of the existing custom metadata element; and
storing data in the custom metadata element with a unique identifier that is the same as the unique identifier of the imported custom metadata element.

9. The method of claim 8 wherein the imported custom metadata element specifies a group with a group name and an area and when an existing group of the application has a group name and an area that is not the same as the group name and the area of an existing custom metadata element, creating a new group with the group name and the area of the group of the imported custom metadata element.

10. The method of claim 9 including adding the imported custom metadata element to the bottom of the group.

11. The method of claim 8 wherein the receiving includes receiving a metadata for the imported custom metadata element that includes name, unique identifier, type, format, and location.

12. The method of claim 11 wherein the metadata specifies the entity with which the imported custom metadata element is associated.

13. The method of claim 11 wherein the metadata is stored in accordance with an XML schema.

14. The method of claim 8 wherein when an existing custom metadata element of the application program has a name that is the same as the name of the imported custom metadata element and a unique identifier that is the same as the unique identifier of the imported custom metadata element, retaining the name and the unique identifier of the existing custom metadata element.

15. A computer-readable storage memory embedded with computer-executable instructions for controlling a computing device to resolve conflicts between names and unique identifiers of custom metadata elements of an application, by a method comprising:
receiving an indication of a name and a unique identifier of the imported custom metadata element of the application program;
determining whether an existing custom metadata element of the application program has a name that is the same as the name of the imported custom metadata element and a unique identifier that is different from the unique identifier of the imported custom metadata element;
when it is determined that an existing custom metadata element of the application program has a name that is the same as the name of the imported custom metadata element and a unique identifier that is different from the unique identifier of the imported custom metadata element, changing the name of the existing custom metadata element, and creating a new custom metadata element having the name and the unique identifier of the imported custom metadata element;
determining whether an existing custom metadata element of the application program has a name that is different from the name of the imported custom metadata element and a unique identifier that is the same as the unique identifier of the imported custom metadata element; and
when it is determined that an existing custom metadata element of the application program has a name that is different from the name of the imported custom metadata element and a unique identifier that is the same as the unique identifier of the imported custom metadata element, changing the name of the existing custom metadata element to the name of the imported custom metadata element.

16. The computer-readable storage memory of claim 15 wherein the imported custom metadata element specifies a group with a group name and an area and when no existing group of the application has a group name and an area that is the same as the group name and the area of an imported custom metadata element, creating a new group with the group name and the area of the group of the imported custom metadata element.

17. The computer-readable storage memory of claim 15 wherein the receiving includes receiving metadata for the imported custom metadata element that includes name, unique identifier, type, format, and location.

18. The computer-readable storage memory of claim 17 wherein the metadata specifies the entity with which the imported custom metadata element is associated.

19. The computer-readable storage memory of claim 18 wherein the metadata is stored in accordance with an XML schema.

20. The computer-readable storage memory of claim 15 wherein when an existing custom metadata element of the application program has a name that is the same as the name of the imported custom metadata element and a unique identifier that is the same as the unique identifier of the imported custom metadata element, retaining the name and the unique identifier of the existing custom metadata element.

* * * * *